(12) United States Patent
Duncan et al.

(10) Patent No.: US 7,117,422 B2
(45) Date of Patent: Oct. 3, 2006

(54) ERROR DETECTION IN STORAGE DATA

(75) Inventors: William L. Duncan, Berthoud, CO (US); Wayne Ihde, Boulder, CO (US); Michael Tibbetts, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 535 days.

(21) Appl. No.: 10/055,593

(22) Filed: Jan. 22, 2002

(65) Prior Publication Data

US 2003/0140299 A1     Jul. 24, 2003

(51) Int. Cl.
*G11C 29/00* (2006.01)

(52) U.S. Cl. .................................. 714/766
(58) Field of Classification Search ............ 714/6, 714/52, 54, 718, 763–764, 753, 766, 769, 714/773
See application file for complete search history.

(56) References Cited

U.S. PATENT DOCUMENTS

| | | | |
|---|---|---|---|
| 5,617,432 A * | 4/1997 | Eggenberger et al. ...... 714/752 |
| 5,734,815 A * | 3/1998 | Schatzberg .................... 714/6 |
| 6,629,273 B1 * | 9/2003 | Patterson .................... 714/718 |
| 2002/0184556 A1 * | 12/2002 | Hashemi ........................ 714/6 |

OTHER PUBLICATIONS

Gene Milligan, ed., "dpANS SCSI-3 Block Commands (SBC)", Revision 8c, Nov. 13, 1997, pp. 30-38.
U.S. Appl. No. 09/917,315, filed on Jul. 27, 2001,"End-to-End Disk Data Checksumming", invented by W.L. Duncan.

* cited by examiner

*Primary Examiner*—Shelly Chase
(74) *Attorney, Agent, or Firm*—Blakely Sokoloff Taylor & Zafman, LLP

(57) ABSTRACT

Provided are a method, system, and an article of manufacture for detecting errors while accessing a storage device. A host system writes an identical initialization pattern into each block of a plurality of blocks while formatting the storage device. Each block of the plurality of blocks has a checksum field capable of containing a value. Any host system generates an error when data from a retrieved block from the plurality of blocks computes to a checksum that is different from the value contained within the checksum field for the retrieved block, and the retrieved block does not contain the initialization pattern.

38 Claims, 7 Drawing Sheets

ERROR DETECTION IN STORAGE DATA

BACKGROUND OF THE INVENTION

1. Field of the Invention

The present invention relates to a method, system, and an article of manufacture for implementing an error detection scheme in storage data.

2. Description of the Related Art

A block addressable storage device is typically comprised of one or more disks, such as flexible disks, rigid disks, optical discs, and stores data in addressable groups referred to as blocks. The number of bytes of data contained in a single block is called the block length or block size. While the block length can be any number of bytes, storage device manufacturers often format the storage devices into blocks with a block length of 512 bytes. The storage devices can be reformatted into blocks of a different block length. Application programs that read and write data to the storage devices need assurance that data integrity is maintained as data is transferred between the storage device and application program.

Prior art storage devices include techniques for assuring data integrity. For instance, storage device controllers often utilize an error correcting code (ECC) algorithm to detect and possibly correct hardware related failures within the storage device. In addition to hardware errors, data integrity may be compromised by transport errors that occur during data transmission via Small Computer System Interface (SCSI) cables, storage adapter cards and storage device drivers. Failure to detect the transport errors, as well as disk error allows corrupt data to propagate. Undetected transport errors that occur within data are referred to as "silent data corruption." Silent data corruption occurs when the application program retrieves data from the storage system (i.e. a disk read request) that is stale, altered or lost without being detected or corrected. Stale data is data that was written at an earlier time and is incorrectly returned in place of the more recent (lost) data. Altered data is data that is present but corrupted or changed and no longer correctly represents the original data. Finally, lost data is data that is lost and no longer available. The presence of such errors is of substantial concern for critical applications where the impact of undetected errors can be catastrophic.

In prior art, checksums have been used to detect errors in data. The checksum of a group of data items is stored or transmitted with the group of data items. The checksum value is calculated by treating the data items as numeric values. Checksums are widely used in network protocols, where a checksum generated from the bits of a message accompanies the message during transmission. For instance, many checksum algorithms perform an XOR of the bits in the message to generate the checksum. The receiving station then applies the same checksum algorithm (e.g. XOR) to the message and checks to make sure that the computed numerical value is the same as the checksum within the transmission. In view of the prevalence of silent data corruption, there is a need in the art to provide an improved checksum based technique to detect silent data corruption.

SUMMARY OF THE PREFERRED EMBODIMENTS

Provided are methods, systems and programs to detect errors while accessing a storage device. A host system retrieves one block from a plurality of blocks, wherein a pattern has been written into the plurality of blocks during initialization of the blocks in a storage device. The host system determines whether the retrieved block includes the pattern and also determines whether a checksum computed from the retrieved block is different than the value in a checksum field of the retrieved block. The host system generates an error when data from the retrieved block from the plurality of blocks computes to a checksum that is different from the value contained within the checksum field for the retrieved block, and the retrieved block does not contain the initialization pattern.

Still further, the pattern written into the plurality of blocks while initializing data in the storage device is written during a format operation on the storage device, wherein no checksum value is written to the checksum field during the format operation.

Further implementations provide a system, method and article of manufacture for formatting a storage device into a plurality of blocks of a block size. A set of bits is reserved within each of the plurality of blocks, to store a pattern. A checksum field is reserved within each of the plurality of blocks, to store a checksum. The storage device is formatted into the plurality of blocks. During the formatting, the pattern is written into the set of bits within each of the plurality of blocks, wherein no checksum value is written to the checksum field during the formatting.

In one implementation, the formatting comprises executing of a SCSI FORMAT UNIT command. In further implementations the SCSI FORMAT UNIT command is configured by a host system and executed by the storage device. The implementations provide a checksum based technique that can detect errors.

BRIEF DESCRIPTION OF THE DRAWINGS

Referring now to the drawings in which like reference numbers represent corresponding parts throughout

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Although checksums have been used within storage devices, existing checksum features within storage devices have limitations. For instance, checksums implemented within the storage device alone cannot detect silent data corruption which occurs between the storage device and the host applications. The copending and commonly assigned patent application entitled "End-to-End Disk Data Checksumming," having U.S. patent application Ser. No. 09/917, 315 and filed on Jul. 27, 2001, discloses an error detection scheme implemented in a host system to detect errors, such as transmission errors, resulting from silent data corruption. While writing data to a block of a storage device, the host calculates a checksum corresponding to the data and writes the checksum into the block of storage device. Subsequently, while reading the data from the block of the storage device, the host compares a checksum calculated from the read data to the previously written checksum. If the calculated checksum does not match the previously written checksum the host generates a checksum error.

To utilize the error detection scheme described in the patent application entitled "End-to-End Disk Data Checksumming," a host may write a checksum to every block of the storage device after formatting the storage device in order to avoid a checksum error during the first read after the disk is formatted. The error detection scheme described in the patent application entitled "End-to-End Disk Data Checksumming" does not allow the host to detect silent data corruption without having to write the checksum to every block of the storage device after formatting the storage device. The process of writing the checksum to each block after formatting the storage device may be time consuming. For this reason, described implementations provide techniques to initialize the disk for error detection, such as the error detection schemes disclosed in "End-to-End Disk Data Checksumming."

Figure 1A:
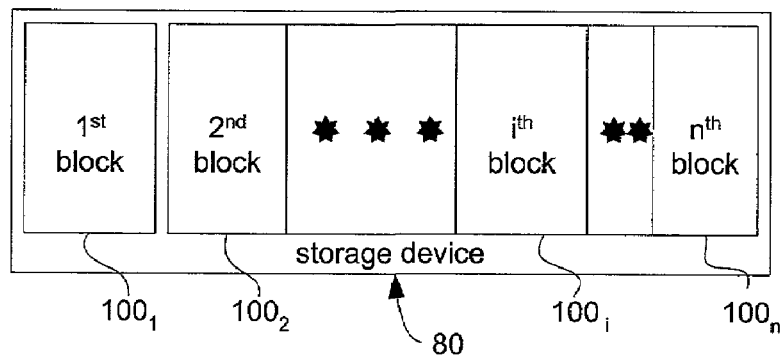
FIG. 1a illustrates the blocks of a storage device in accordance with implementations of the invention.

FIG. 1a illustrates a storage device 80 formatted into a plurality of n blocks, $1^{st}$ block $100_1$, $2^{nd}$ block $100_2$, $i^{th}$ block $100_i$, $n^{th}$ block $100_n$. The number of blocks in the storage device 80 can exceed several million or more when the storage device 80 has a large capacity. The storage device 80 may comprise any storage device known in the art, such as a single disk drive, a Direct Access Storage Device (DASD), Just a Bunch of Disks (JBOD), a Redundant Array of Independent Disks (RAID), a tape library, an optical library, and so on. Manufacturers of the storage device 80 often preformat the storage device 80 into blocks of block length 512 bytes when shipping the storage device 80. However, it is possible to reformat the storage device 80 into blocks of any size.

Figure 1B:
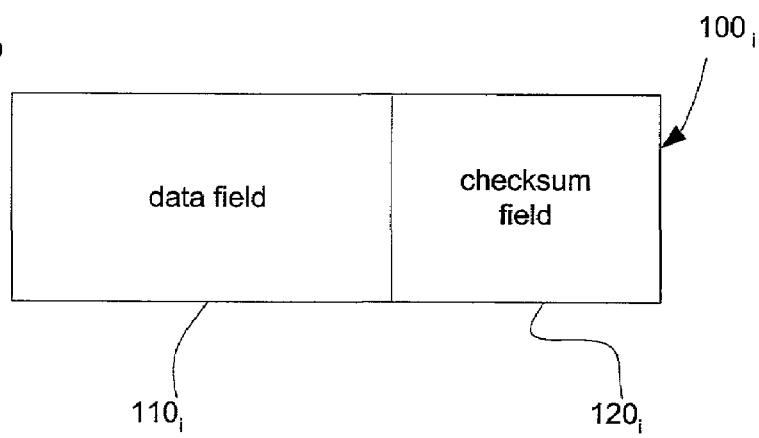
FIG. 1b illustrates the checksum field within a block of a storage device in accordance with implementations of the invention.

FIG. 1b illustrates the $i^{th}$ block $100_i$ contained within the storage device 80. The block $100_i$ contains data field $110_i$ and a checksum field $120_i$. The checksum field $120_i$ stores a checksum corresponding to data in data field $110_i$. In one implementation the checksum field $120_i$ is 16 bytes, and the data is 512 bytes giving a total of 528 bytes for the block length of each block. Each of the blocks $100_1, 100_2, \ldots 100_i, \ldots 100_n$ has the checksum field $120_i$ and the data field $110_i$. In certain implementations, the checksum is comprised of a 32-bit Exclusive-Or (XOR) checksum. However, the checksum can be calculated using any checksumming technique known in the art. The checksum for each block is kept with the data in the same block rather than in a separate location on the storage device 80. In alternative implementations, the checksum for each block can be kept in a separate location on the storage device 80 or on a different storage device.

Figure 1C:
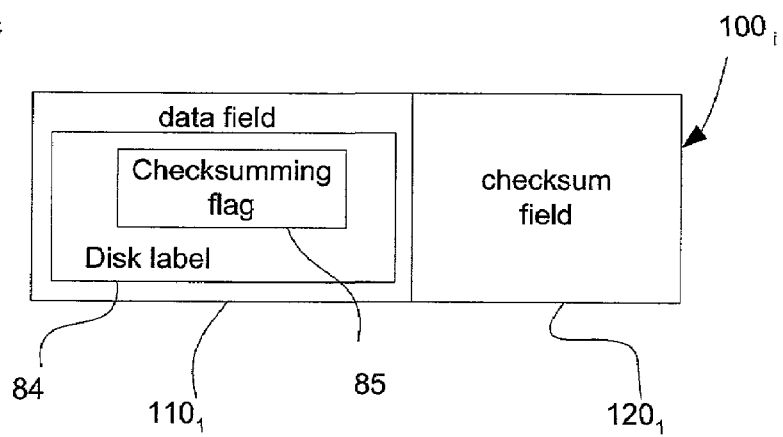
FIG. 1c illustrates a disk label within a block of a storage device in accordance with implementations of the invention.

FIG. 1c illustrates the disk label 84 within the first block $100_1$ of a storage device in accordance with implementations of the invention. A disk label 84 is part of the data field $110_1$ on the first block $100_1$ of the storage device 80, and the disk label 84 identifies the storage device 80. The disk label 84 also contains a checksumming flag 85. The checksumming flag 85 indicates whether the storage device 80 contains checksums.

Figure 2:
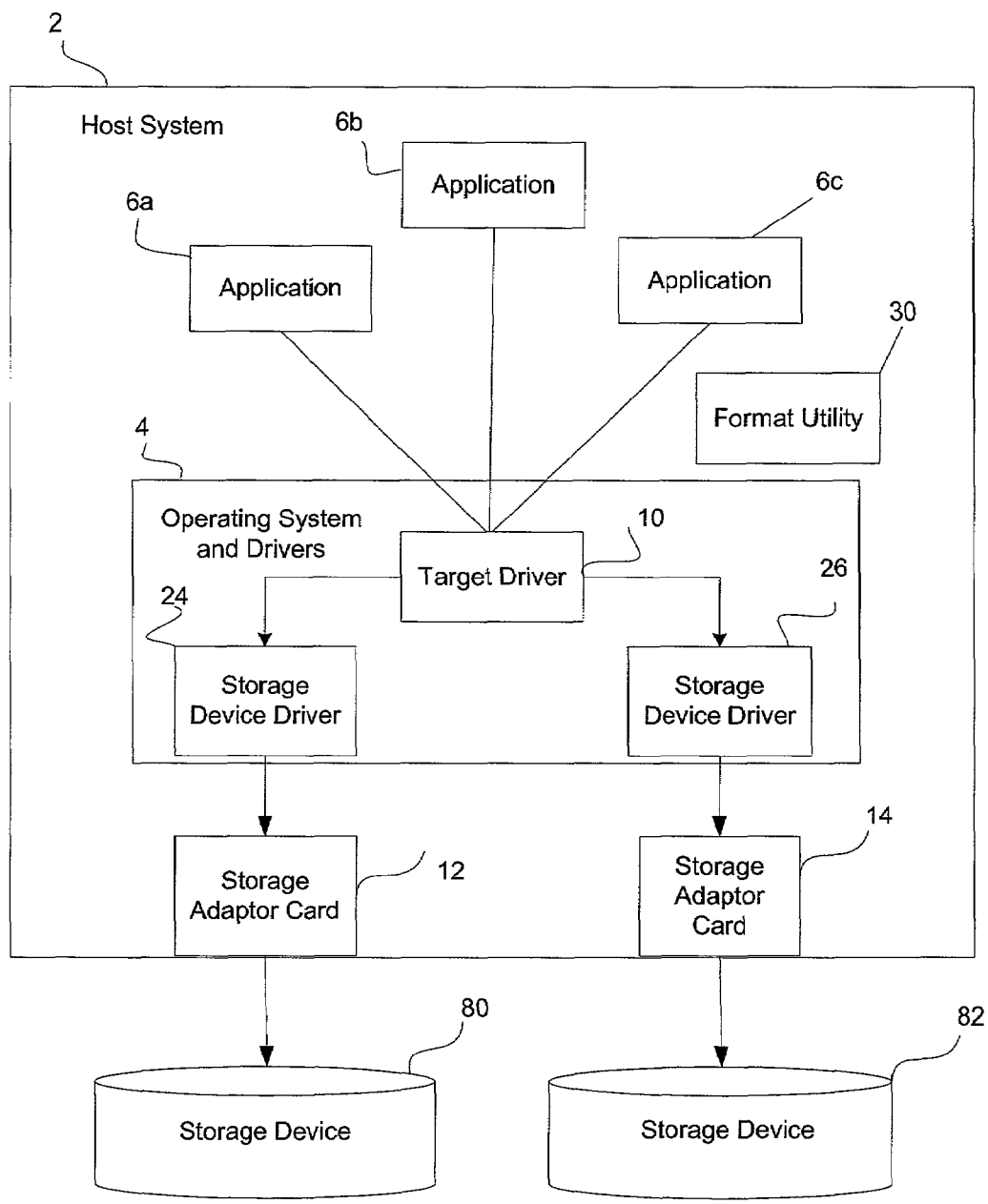
FIG. 2 illustrates a block diagram of a first computing environment in which certain aspects of the invention are implemented.

FIG. 2 illustrates a computing environment for the implementation. A host system 2 includes an operating system 4 (the operating system includes device drivers) and is capable of executing multiple application programs 6a, 6b, 6c. The host 2 may comprise any computational device known in the art including a server class machine, a mainframe, a desktop computer, a laptop computer, a hand held computer, a telephony device. The operating system 4 may comprise any operating system known in the art capable of concurrently executing multiple application programs 6a, 6b, 6c and concurrently generating I/O requests. Although multiple applications can be executed on the host 2, only three application programs 6a, 6b, 6c are shown for illustration purposes. The applications can be any applications known in the art. The host system 2 further includes a target driver 10, two storage device drivers 24 and 26, and storage adapter cards 12 and 14. A format utility 30 is also present within host system 2. The format utility 30 can be used by the host system 2 to format storage devices (e.g. the storage device 80, or storage device 82). Alternatively, the code for the format utility 30 can be stored in a separate storage unit or run from a command prompt (e.g. UNIX shell prompt) manually from the host system 2, or can be run from any other system connected to the storage devices 80 and 82. Although two storage devices 80, 82 are shown, the host system 2 may communicate with only one or more than two storage devices.

The application programs 6a, 6b, 6c generate (I/O) requests to the two storage devices 80 and 82 (there may be additional storage devices), where the data files used by the application programs 6a, 6b, 6c are stored. In certain implementations, to coordinate the I/O process, all I/O requests are transferred from the application programs 6a, 6b, 6c to a single target driver 10 for communicating with multiple storage device drivers 24 and 26. The target driver 10 includes code to process, generate and verify checksum values. If an I/O request is for storage device 80, the target driver 10 determines which blocks within storage device 80 should be accessed to read/write the data used by the applications 6a, 6b, 6c. In addition, the target driver 10 adds a checksum to the data blocks on the write function and subtracts the checksum on the read function, which will be explained in greater detail with respect to FIGS. 5 and 6. The target driver 10 can communicate with the storage devices 80, 82 through the storage device drivers 24, 26 and the storage adapter cards 12, 14 in, for example, any of a number of ways known to those of ordinary skill in the art.

The target driver 10 generates generic device commands in response to I/O requests from the applications 6a, 6b, 6c. The generic device commands are converted to device specific commands by the storage drivers 24 and 26. In certain implementations, the target driver 10 handles all the checksumming and error detection operations, thereby avoiding the need to modify the storage device drivers 24 and 26, which are typically supplied by the manufacturers of the corresponding storage devices. However, in alternative implementations, operations described as performed by the target driver can be performed by the storage device drivers.

Figure 3:
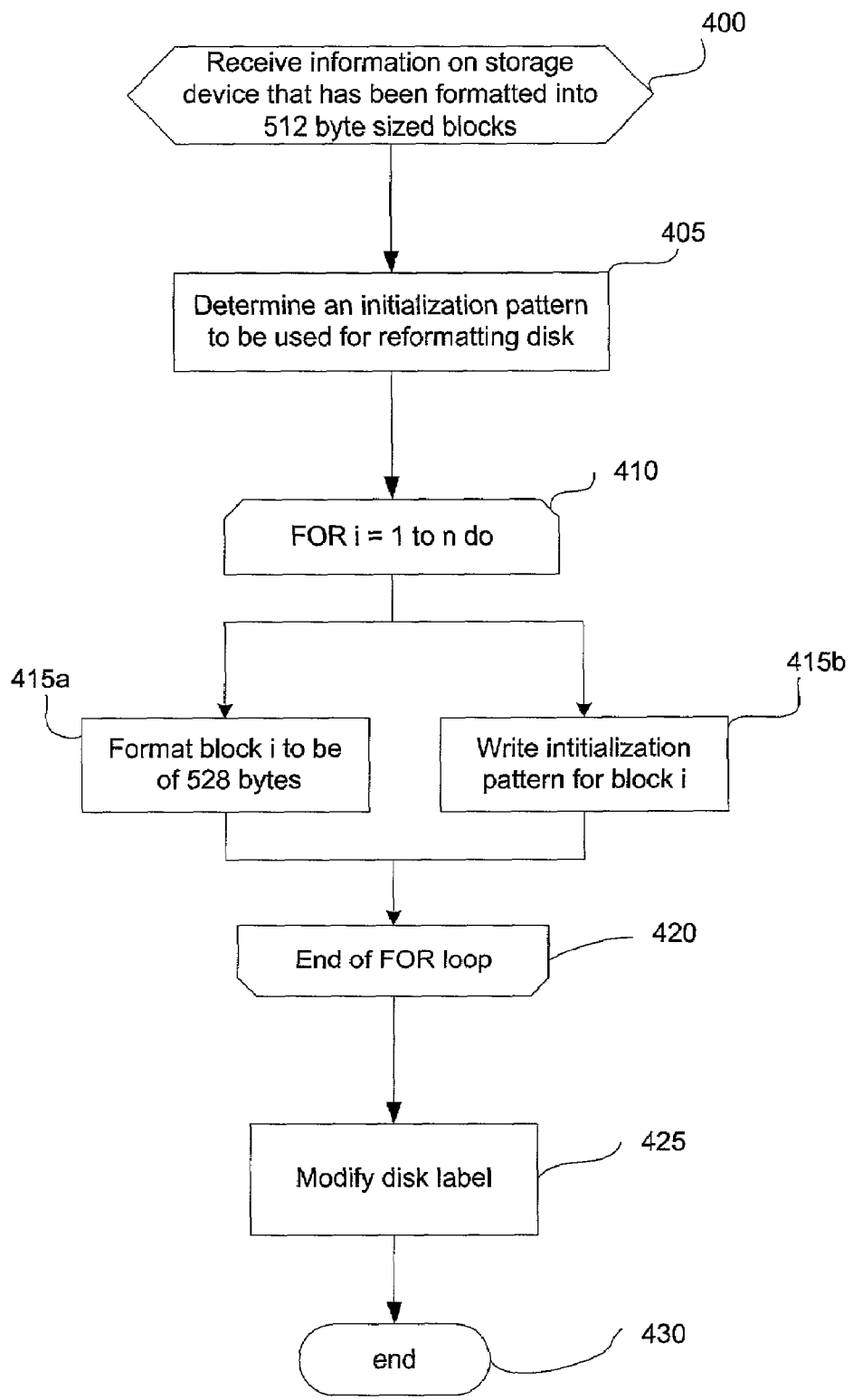
FIG. 3 illustrates logic to write an initialization pattern when a host formats a disk in accordance with implementations of the invention.

FIG. 3 illustrates logic implemented in the target driver 10 to format and write initialization patterns in a single pass through the storage device 80 when the host 2 formats the storage device 80 in accordance with an implementation of the invention. Control begins with the host 2 reading (at block 400) the information related to the storage device 80 where the storage device 80 has been formatted into 512 byte blocks. The information related to the storage device 80 may be kept either within the storage device 80 or in various configuration files within host 2. The various configuration files may be created when the storage device 80 and the storage adapter card 12 are attached to the host 2, and the host 2 installs the storage device driver 24. At block 405, the host 2 determines an initialization pattern to be written in every block of the storage device 80. The initialization pattern is stored in a sequence of bits. A FOR loop begins at block 410 and extends to block 420. At block 410, the block number i is incremented from 1 to the number of blocks, n, at every loop of the FOR loop. At the conclusion of block 410, the host executes block 415a and 415b in a single operation. Alternatively the host may execute block 415a and then immediately execute block 415b. At block 415a, host 2 formats block i into 528 bytes. At block 415b, the host 2 writes the initialization pattern onto block i. At the conclusion of blocks 415a and 415b, control passes (at block 420) to the end of the FOR loop and control passes back to block 410. After the host 2 formats and writes the initialization pattern on block n of the storage device 80, control passes to block 425, where the host 2 modifies the disk label 84 by writing information pertaining to the initialization pattern on storage device 80. The host 2 also sets the checksumming flag 85 on disk label 84, to indicate that the disk may operate as a checksummed disk. Host 2 may modify the process of FIG. 3 for different storage devices and storage device drivers. The modifications may depend on the particular specifications of the storage device 80. The particular specifications may depend on the industry standard the storage device 80 supports, or may be proprietary to storage device 80.

Figure 4:
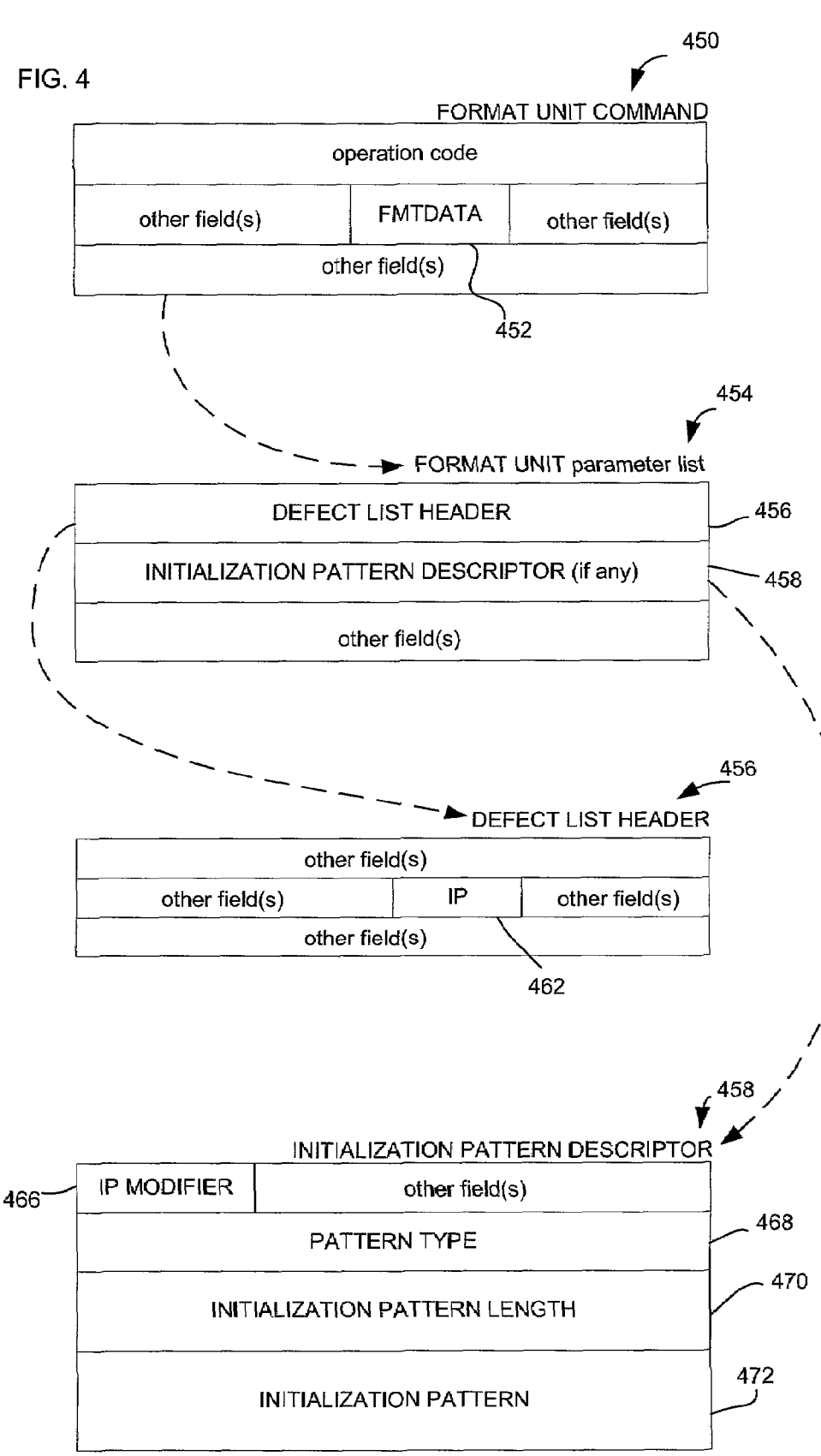
FIG. 4 illustrates the use of SCSI FORMAT UNIT command in accordance with implementations of the invention.

FIG. 4 illustrates various data structures associated with the FORMAT UNIT command 450 specified in the Small Computer System Interface 3 (SCSI-3) specification in accordance with implementations of the invention. The FORMAT UNIT command 450 includes data structures that are used to provide an initialization pattern for use when formatting the blocks. Certain implementations use the FORMAT UNIT command 450 of the SCSI-3 specification to format and write initialization patterns in a single pass through the storage device 80 (as described in FIG. 3). Further details of the FORMAT UNIT command 450 are described in the publication entitled "Information Technology—SCSI-3 Block Commands" by American National Standards Institute, Inc. (revision 8c, published on 13 Nov. 1997; also available as technical report/standard NCITS 306:1998), which publication is incorporated herein by reference in its entirety.

FIG. 4 shows the FORMAT UNIT COMMAND 450 having the FMTDATA 452 field, and other fields. In certain implementations, the host 2 sets the FMTDATA 452 field to one. When the FMTDATA field is set to one, any program that interprets the FORMAT UNIT COMMAND looks for the FORMAT UNIT parameter list 454. The FORMAT UNIT parameter list 454 starts with the DEFECT LIST HEADER 456. The host 2 sets the IP 462 field to one in the DEFECT LIST HEADER 456. When the IP 462 field is set to one, any program that interprets the FORMAT UNIT COMMAND 450 looks for the INITIALIZATION PATTERN DESCRIPTOR field 458. In the INITIALIZATION PATTERN DESCRIPTOR field 458, the host 2 sets the IP MODIFIER 466 field to be zero, the INITIALIZATION PATTERN LENGTH 470 field to the number of bytes in the initialization pattern, the INITIALIZATION PATTERN 472 field to a pattern, and the PATTERN TYPE 468 field to be one to fill the pattern repeatedly within the number of bytes in the initialization pattern. For example, if the pattern is hexadecimal 5A3C and there are eight bytes in the initialization pattern, then the initialization pattern is hexadecimal 5A3C5A3C5A3C5A3C.

Figure 5:
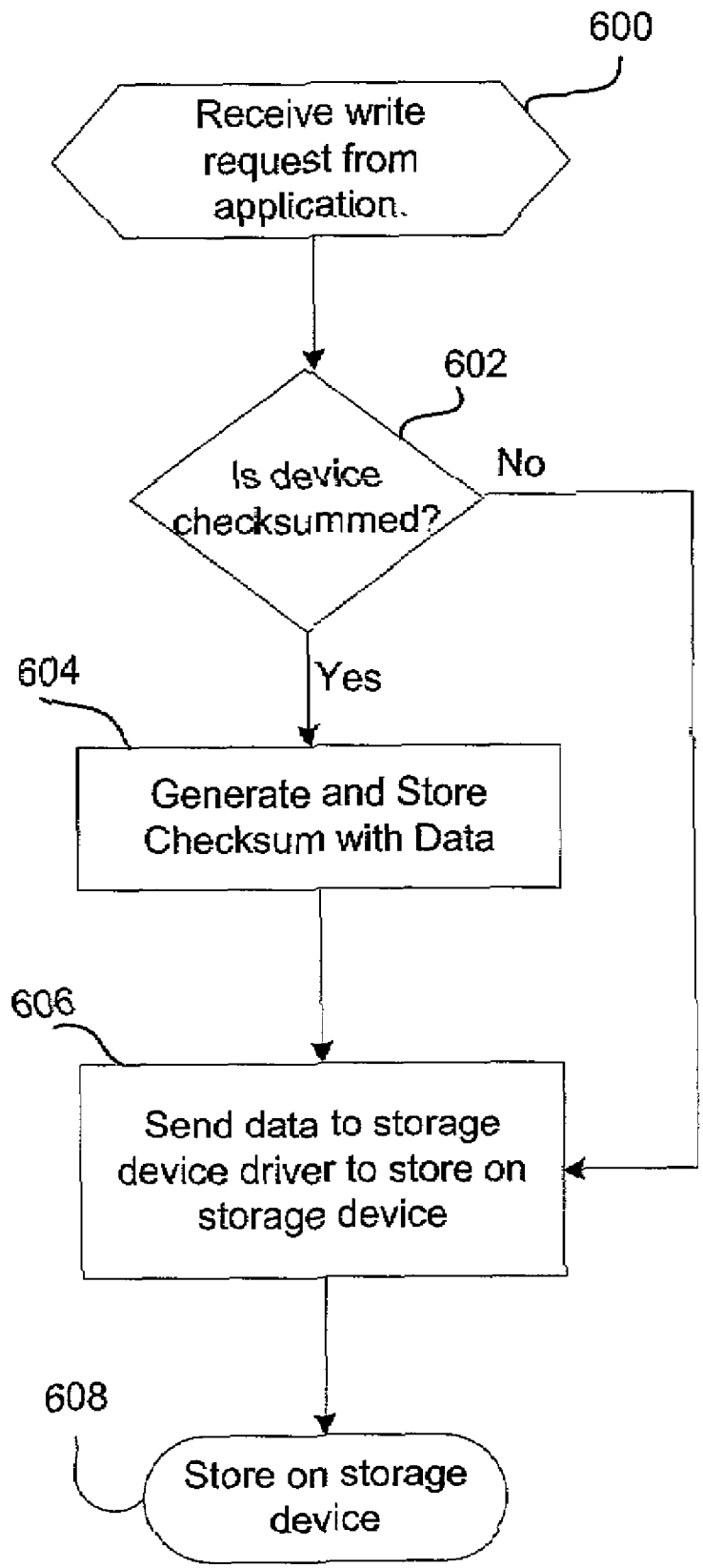
FIG. 5 illustrates logic to write to a storage device in accordance with implementations of the invention.

FIG. 5 illustrates logic in the host 2 to write to the storage device 80 in accordance with implementations of the invention. Control begins at block 600 when the target driver 10 receives a write request from one application 6a, 6b, 6c. Since most storage device drivers manipulate data in 512 byte sized blocks, the write request is processed in the target driver 10 in data blocks of 512-bytes. Before target driver 10 performs the write function, the target driver 10 first checks the checksumming flag 85 on the disk label 84 and determines (at block 602) whether checksumming is enabled for the storage device 80. If the storage device 80 does not have checksumming enabled, then the checksum operation cannot be performed and the write request is sent (at block 606) to the storage device 80 via the storage adapter card 12 and the storage device driver 24 without using the checksum algorithm. However, if the storage device 80 has checksumming enabled, the target driver 10 (at block 604) allocates memory and computes a checksum corresponding to the 512 byte data blocks of the write request. The checksum is then stored with the write data to increase the data size of the write data block up to 528-bytes. At block 606, the 528 byte data block (with the checksum included) is then sent to the storage device driver 24, which communicates directly with the storage adapter card 12. The storage device driver 24 instructs (at block 608) the storage adapter card 12 to write the data block with the checksum onto storage device 80 at the location determined by the target driver 10 in a manner known in the art.

Figure 6:
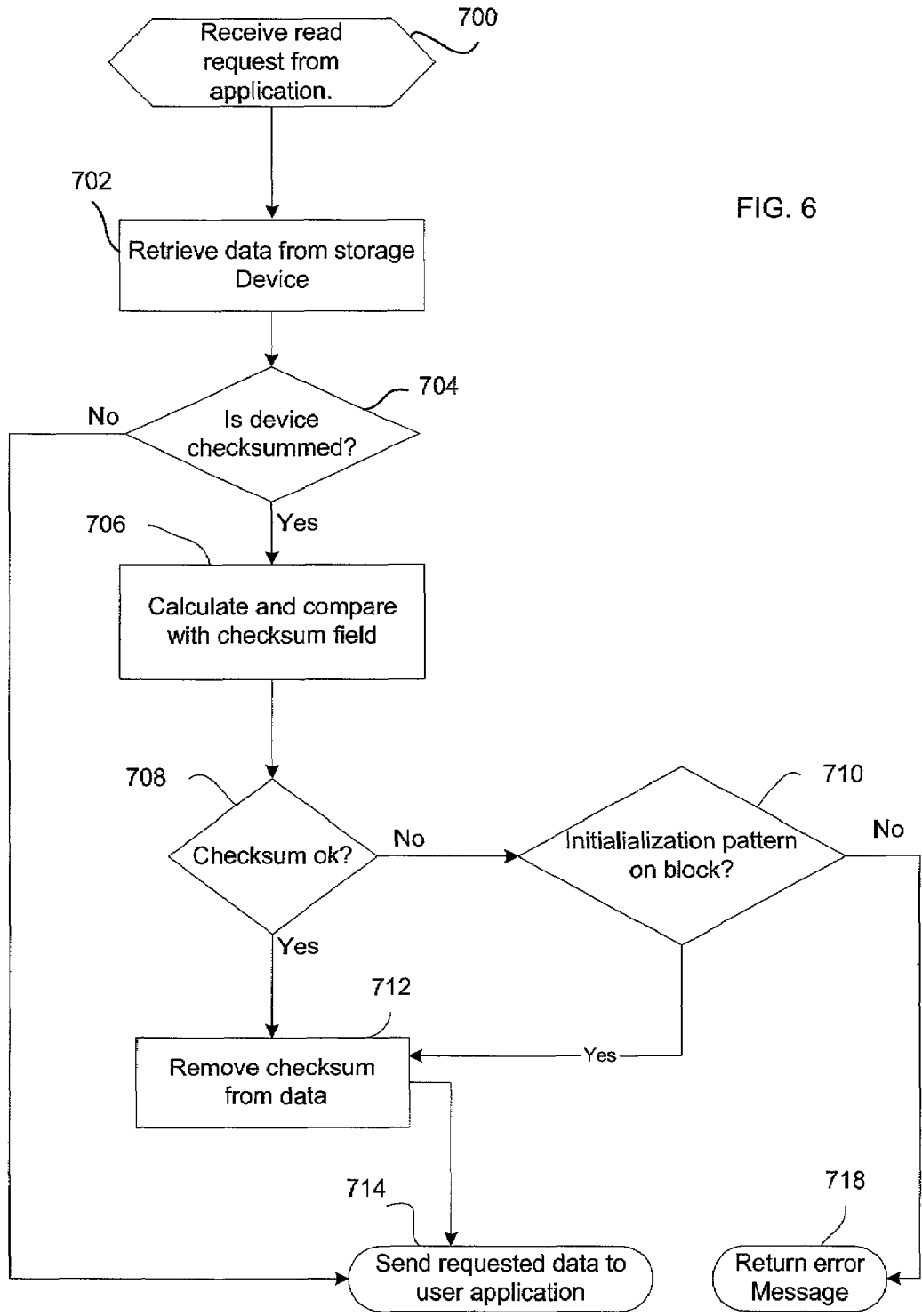
FIG. 6 illustrates logic to read from a storage device in accordance with implementations of the invention.

FIG. 6 illustrates logic in host 2 to read from a storage device in accordance with the implementation. Control begins at block 700 when the target driver 10 receives a read request from one application 6a, 6b, 6c. Upon identifying the read request, the target driver 10 locates the address where the data blocks are stored on the storage device 80. The target driver 10 then sends the location of the requested data blocks to the storage device driver 24, and the storage device driver 24 retrieves (at block 702) the data blocks from the storage device 80 through the storage adapter card 12 in a manner known in the art.

At block 704, the target driver 10 determines whether the retrieved data block has incorporated the checksum feature by reading the checksumming flag 85 on the disk label 84. If the checksumming flag 85 indicates that checksumming is not enabled for this device, then the target driver 10 will understand that the checksum feature was not added during the write function, and the checksum algorithm will not be used. In such case, the retrieved data blocks are sent (at block 714) to the application program 6a, 6b, or 6c in a manner known in the art. However, if checksum is enabled, the target driver 10 will use the checksum algorithm. Thus, in certain implementations the same target driver 10 can be used in a storage device 80 using 512-byte unchecksummed disk blocks or 528-byte checksummed disk blocks. At block 706, the target driver 10 calculates the checksum associated with the retrieved data block. At block 708, a compare function is performed between the calculated checksum and the checksum contained within checksum field $120_i$ of the retrieved data block. The compare operator will return a value of "true" only if both values are the same. If a "true" value is returned, then the target driver 10 (at block 712) strips away the checksum from the read data to decrease the data size of the write data block from 528-bytes to 512-bytes.

At block 714, the data blocks are sent to the application program 6a, 6b, or 6c in the format that the application program 6a, 6b, or 6c can read (i.e. 512-byte disk blocks). If a "false" value is returned at block 708, the target driver 10 determines whether the block of data was read from a block that has not been written to before. In block 710, the target driver 10 determines whether the initialization pattern is present on the block of data $100_i$. If the initialization pattern occupies all the bytes of the data field $110_i$ on the block of data $100_i$, then control proceeds to block 712 to remove the checksum and return the data, which in this case is just the initialization pattern. In alternative implementations where the initialization pattern is kept on some of the bytes of the data field $110_i$ of the block of data $100_i$, the initialization pattern may be removed before returning the data. In other alternative implementations where the initialization pattern is kept in the checksum field $120_i$, the checksum field $120_i$ may be removed before returning the data. If in block 710, the initialization pattern is absent on the block of data $100_i$, then the target driver 10 concludes that an incorrect data block was returned or that the data was corrupt. At block 718, an error message is sent to the application program 6a, 6b, or 6c, notifying that an error was detected during the read request.

Including the checksum program at the host or driver level, versus within the disk drive or storage device enclosure, allows detection of silent data corruption that occurs between the disk drive and the host. As stated, silent data corruption may result from transport errors occurring in the SCSI cables, storage driver adapters, storage device drivers, etc. By placing the checksum routine at the host or driver level, silent data corruption occurring upstream from the disk drive is detected. In addition, locating the checksum routine at the host or driver level implements the checksum independent of the hardware. No additional hardware is required to perform the checksum function. Instead, a software update can be performed to an existing host system to install an updated target driver containing the checksum program. Furthermore, keeping the checksum function at the host or driver level allows the checksum to remain functionally transparent to users, operating without affecting existing applications on the host system or requiring updates or modifications to host system applications.

Figure 7:
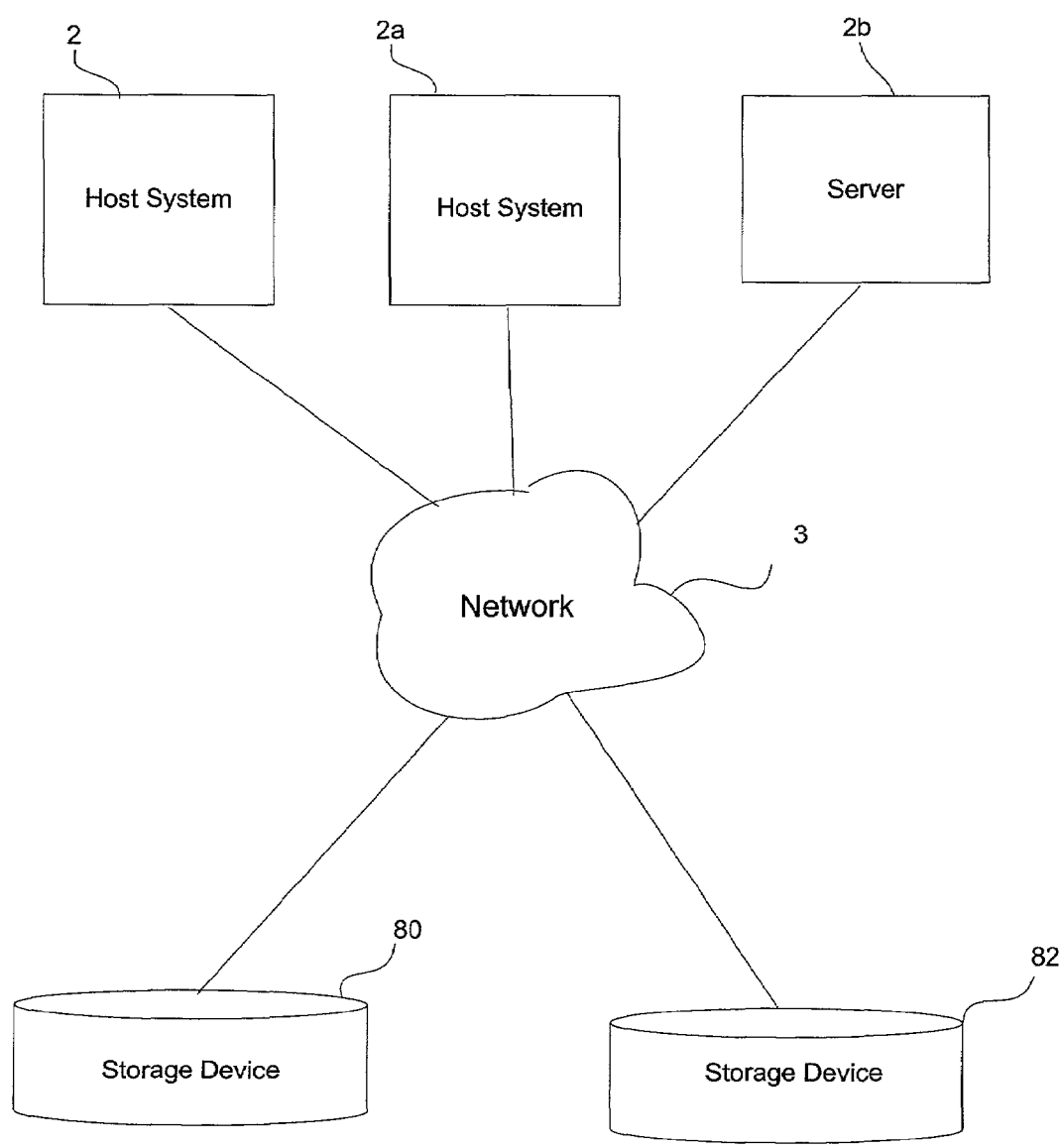
FIG. 7 illustrates the block diagram of a second computing environment in which certain implementations of the invention can be implemented.

FIG. 7 illustrates another implementation where in addition to the host 2 there is another host 2a and a server 2b. The server 2b can be any computational device known in the art. The hosts 2 and 2a and the server 2b are connected to the storage devices 80 and 82 via a network 3. The server 2b formats and writes the initialization pattern on the storage devices 80 and 82. Subsequently, the host systems 2 and 2a and optionally the server 2b, read from and write to the storage devices 80 and 82. FIG. 7 illustrates the situation where one computational device formats the storage devices and subsequently a plurality of computational devices perform read and write operations with respect to the storage devices 80 and 82. The servers 2, 2a, 2b all include the target driver 10 and perform the operations described in FIGS. 5 and 6. In one implementation, the storage devices 80 and 82 may be part of a storage area network geographically distant from the location of the host systems 2 and 2a. Similarly, the server 2b may be geographically distant from the location of the host systems 2 and 2a.

ADDITIONAL IMPLEMENTATION DETAILS

The described error detection techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium such as, magnetic storage medium (e.g. hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

The described implementations show the host both formatting the storage devices as well as reading and writing to the storage devices. The described implementations provided a technique for managing the flow of I/Os to a device driver for a storage device. A 32-bit XOR algorithm was used for checksumming. Alternatively, other algorithms can be used for checksumming which will compare the checksum of the retrieved data with the requested data, such as the Fletcher32-p algorithm. In addition, the checksum was described with a certain number of bytes of information. Alternatively, the storage device can be reformatted to any other disk block length to increase or decrease the disk block length to accommodate different checksum sizes and data blocks. For example, a 520-byte block size maybe used instead of a 528-byte data block. In addition, in the described implementations, the determination of whether the checksum feature was enabled on the storage device was made by checking the checksumming flag on the disk label. Additionally, a determination of whether the checksum feature is enabled can be performed by checking the size of the data blocks in the storage device without the use of the checksumming flag.

In the described implementations, the checksumming feature was performed by the target driver. Alternatively, a checksumming driver could just be layered on top of any of the current I/O driver stacks or implemented in another layer of the I/O subsystem. In addition, the code of the target driver 10 is described as excluding the device driver code for the storage device. Alternatively, the target driver may include the code for one or more device drivers.

The preferred logic of FIGS. 3, 5 and 6 described specific operations occurring in a particular order. Further, the steps may be performed in parallel as well as sequentially. In alternative embodiments, certain of the logic operations may be performed in a different order, modified or removed and still implement preferred embodiments of the present invention. Morever, steps may be added to the above described logic and still conform to the preferred embodiments.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for error detection in digital storage data in a computer system, comprising:
    retrieving one block from a plurality of blocks, wherein the retrieved block has a pattern and a checksum field, and wherein the pattern is written into the plurality of blocks during a format operation on the storage device, wherein no checksum value is written to the checksum field during the format operation;
    determining whether a checksum computed from the retrieved block is different than the value in the checksum field of the retrieved block;
    determining whether the retrieved block includes the pattern; and
    generating an error if the retrieved block does not include the pattern and if the computed checksum is different than the value in the checksum field.

2. The computer-implemented method of claim 1, wherein the block is retrieved in response to a read request from an application.

3. The computer-implemented method of claim 1, further comprising:
    writing data and a calculated checksum to one block after the pattern was written to the blocks during initialization.

4. The computer-implemented method of claim 3, wherein the checksum is calculated by:
    computing the checksum from data received in a write request from an application.

5. The computer-implemented method of claim 1, wherein the checksum is computed with an Exclusive-Or operation.

6. The computer-implemented method of claim 1, wherein the pattern and checksum field are at identical locations in each of the plurality of blocks.

7. The computer-implemented method of claim 1, wherein the block of data retrieved from the storage device is processed by a target driver, a device driver specific to the storage device, and an adapter card specific to the storage device.

8. The computer-implemented method of claim 7, wherein the block of data is retrieved by:
    receiving at the target driver a first request for data from an application;
    generating a second request corresponding to the first request by the target driver;
    sending the second request from the target driver to the device driver;
    generating a third request corresponding to the second request at the device driver, wherein the third request is formatted to be compatible with the hardware of the storage device; and
    transmitting the third request from the device driver to the storage device via the adapter card.

9. The computer-implemented method of claim 8, wherein the first request is for data having a first byte length and wherein the second request is for data having a second byte length longer than the first byte length.

10. A computer system for error detection in digital storage data, wherein the digital storage data is contained in a storage device, and wherein the digital storage data comprises a plurality of blocks, the computer system comprising:
    means for retrieving one block from the storage device, wherein the retrieved block has a pattern and a checksum field, and wherein the pattern is written into the plurality of blocks during a format operation on the storage device, wherein no checksum value is written to the checksum field during the format operation;
    means for determining whether a checksum computed from the retrieved block is different than the value in the checksum field of the retrieved block;
    means for determining whether the retrieved block includes the pattern; and
    means for generating an error if the retrieved block does not include the pattern and if the computed checksum is different than the value in the checksum field.

11. The computer system of claim 10, further comprising:
    means for writing data and a calculated checksum to one block after the pattern is written to the blocks during initialization.

12. The computer system of claim 10, further comprising processing the block retrieved from the storage device with a target driver, a device driver specific to the storage device, and an adapter card specific to the storage device.

13. The computer system of claim 12, wherein the means for retrieving the block further performs:
    receiving at the target driver a first request for data from an application; generating a second request corresponding to the first request by the target driver;
    sending the second request from the target driver to the device driver;
    generating a third request corresponding to the second request at the device driver wherein the third request is formatted to be compatible with the hardware of the storage device; and
    transmitting the third request from the device driver to the storage device via the adapter card.

14. A computer readable storage medium containing executable computer program instructions which when executed by a digital processing system cause the system to perform error detection in digital storage data, wherein the digital storage data is contained in a storage device in the digital processing system, wherein the digital storage data comprises a plurality of blocks, and wherein the executable computer program instructions cause the system to perform operations comprising:
    retrieving one block from the plurality of blocks, wherein the retrieved block has a pattern and a checksum field, and wherein the pattern is written into the plurality of blocks during a format operation on the storage device, wherein no checksum value is written to the checksum field during the format operation;

determining whether a checksum computed from the retrieved block is different I than the value in the checksum field of the retrieved block;

determining whether the retrieved block includes the pattern; and generating an error if the retrieved block does not include the pattern and if the computed checksum is different than the value in the checksum field.

15. The computer readable storage medium of claim 14, wherein the block is retrieved in response to a read request from an application.

16. The computer readable storage medium of claim 14, further including data that cause the system to perform operations, comprising writing data and a calculated checksum to one block after the pattern was written to the blocks during initialization.

17. The computer readable storage medium of claim 16, wherein the checksum is calculated by computing the checksum from data received in a write request from an application.

18. The computer readable storage medium of claim 14, wherein the checksum is computed with an Exclusive-Or operation.

19. The computer readable storage medium of claim 14, wherein the pattern and checksum field are at identical locations in each of the plurality of blocks.

20. The computer readable storage medium of claim 14, wherein the block retrieved from the storage device is processed by a target driver, a device driver specific to the storage device, and an adapter card specific to the storage device.

21. The computer readable storage medium of claim 20, wherein the block is retrieved by:
receiving at the target driver a first request for data from an application;
generating a second request corresponding to the first request by the target driver;
sending the second request from the target driver to the device driver;
generating a third request corresponding to the second request at the device driver wherein the third request is formatted to be compatible with the hardware of the storage device and:
transmitting the third request from the device driver to the storage device via the adapter card.

22. The computer readable storage medium of claim 21, wherein the first request is for data having a first byte length and wherein the second request is for data having a second byte length longer that the first byte length.

23. A computer-implemented method for error detection in digital storage data in a computer system, comprising:
writing a pattern into a plurality of blocks during initialization of the blocks in a storage device, wherein each of the plurality of blocks has the pattern and a checksum field;
computing a checksum from data received in a write request from an application and writing the data and the calculated checksum to a first block of the plurality of blocks;
retrieving the first block from the plurality of blocks;
determining whether the checksum computed from the retrieved first block is different than the value in the checksum field of the retrieved first block and whether the retrieved first block includes the pattern; and
generating an error if the retrieved block does not include the pattern and if the computed checksum is different than the value in the checksum field.

24. The computer-implemented method of claim 23, wherein the writing the pattern into the plurality of blocks occurs during a format operation on the storage device, wherein no checksum value is written to the checksum field during the format operation.

25. The computer-implemented method of claim 23, wherein the first block is retrieved in response to a read request from an application.

26. The computer-implemented method of claim 23, wherein the first block retrieved from the storage device is processed by a target driver, a device driver specific to the storage device, and an adapter card specific to the storage device.

27. The computer-implemented method of claim 26, wherein the first block is retrieved by
receiving at the target driver a first request for data from an application;
generating a second request corresponding to the first request by the target driver;
sending the second request from the target driver to the device driver;
generating a third request corresponding to the second request at the device driver, wherein the third request is formatted to be compatible with the hardware of the storage device; and
transmitting the third request from the device driver to the storage device via the adapter card.

28. The computer-implemented method of claim 27, wherein the first request is for data having a first byte length and wherein the second request is for data having a second byte length longer than the first byte length.

29. A computer system for error detection in digital storage data, comprising:
means for writing a pattern into a plurality of blocks during initialization of the blocks in a storage device, wherein the plurality of blocks has a pattern and a checksum field;
means for computing a checksum from data received in a write request from an application and writing the data and the calculated checksum to a first block of the plurality of blocks;
means for retrieving the first block from the plurality of blocks;
means for determining whether the checksum computed from the retrieved first block is different than the value in the checksum field of the retrieved first block and whether the retrieved first block includes the pattern; and
means for generating an error if the retrieved first block does not include the pattern and if the computed checksum is different than the value in the checksum field.

30. The computer system of claim 29, including means for writing the pattern into the plurality of blocks during a format operation on the storage device, wherein no checksum value is written to the checksum field during the format operation.

31. A computer-implemented method, comprising:
retrieving a first block from a plurality of blocks via a target driver, a device driver specific to a storage device, and an adapter card specific to the storage device, wherein the first block includes a checksum field and a pattern previously written into the plurality of blocks;
determining whether a checksum computed from the retrieved first block is different than the value in the checksum field of the retrieved first block;

determining whether the retrieved first block includes the pattern; and generating an error if the retrieved first block does not include the pattern and if the computed checksum is different than the value in the checksum field.

32. The computer-implemented method of claim 31, wherein retrieving the first block further comprises:

receiving at the target driver a first request for data from an application;

generating a second request corresponding to the first request by the target driver;

sending the second request from the target driver to the device driver;

generating a third request corresponding to the second request at the device driver, wherein the third request is formatted to be compatible with the hardware of the storage device; and transmitting the third request from the device driver to the storage device via the adapter card.

33. The computer-implemented method of claim 32, wherein the first request is for data having a first byte length and wherein the second request is for data having a second byte length longer than the first byte length.

34. The computer-implemented method of claim 31, wherein prior to retrieving the first block, writing the pattern into the plurality of blocks during a format operation on the storage device, wherein no checksum value is written to the checksum field during the format operation.

35. The computer-implemented method of claim 31, wherein prior to retrieving the first block, writing a pattern into a plurality of blocks during initialization of the blocks in a storage device.

36. The computer-implemented method of claim 31, further comprising:

writing data and a calculated checksum to the first block after the pattern was written to the plurality of blocks during initialization.

37. The computer-implemented method of claim 36, wherein the checksum is calculated by:

computing the checksum from data received in a write request from an application.

38. The computer-implemented method of claim 31, wherein the pattern and checksum field are at identical locations in each of the plurality of blocks.

* * * * *